March 11, 1969     G. O. SCHREINER     3,432,220
DEVICE, VARIABLE-DENSITY STEREOVIEWING SPECTACLES
Filed June 25, 1965
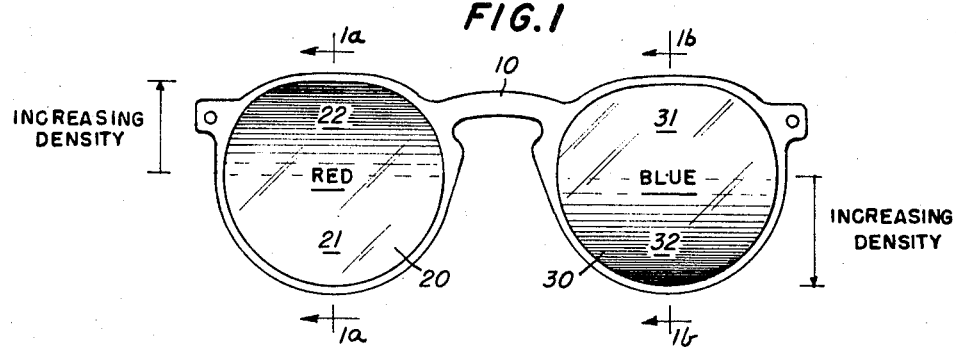
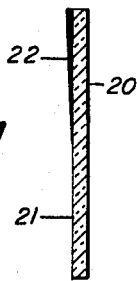 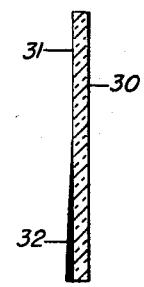
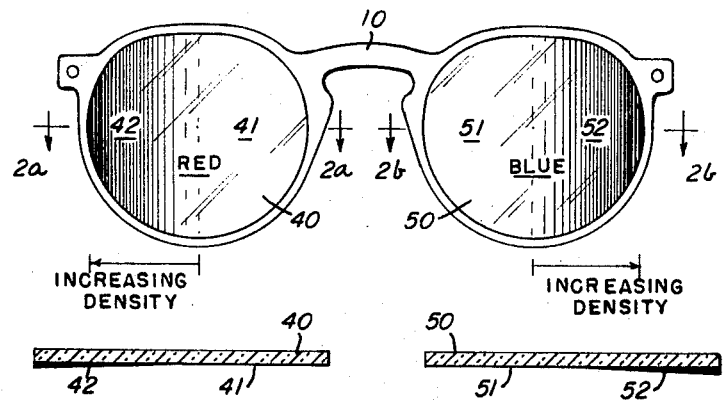
INVENTOR
GILBERT O. SCHREINER
BY *Ernest S. Cohen*
ATTORNEYS

United States Patent Office 3,432,220
Patented Mar. 11, 1969

3,432,220
DEVICE, VARIABLE-DENSITY STEREOVIEWING
SPECTACLES
Gilbert O. Schreiner, Rte. 3, Newburg, Mo. 65550
Filed June 25, 1965, Ser. No. 467,149
U.S. Cl. 350—132                                    3 Claims
Int. Cl. G03b 27/22; G02c 7/10

ABSTRACT OF THE DISCLOSURE

Stereoviewing spectacles equipped with different colored lenses and having light imbalance corrective shading gradually increasing in density in singular opposite directions from a central portion on the respective lenses.

---

The invention herein described and claimed may be manufactured and used by or for the Government of the United States of America for governmental purposes without the payment of royalties thereon or therefor.

This invention relates to anaglyphic viewing of a stereoscopic model, and particularly concerns itself with novel viewing spectacles for improved balancing of light perception by cartographers, photogrammetrists, and stereoplotter operators.

Precise photogrammetric plotting instruments now enable the map maker to extract from aerial photographs much of the detailed information required in preparation of a map that formerly was acquired by laborious and expensive ground surveys. Stereophotogrammetry has thus become an essential element of large mapping operations. In the stereo process, positions are plotted from anaglyphic solutions of line-of-sight intersection problems. Adjacent aerial photographs, taken at a prescribed altitude above a datum plane, are overlapped by projection onto a plane, or plotting table, using two colors of light, usually one red and one blue. The two images of the same terrain can then be viewed stereoscopically by an operator wearing spectacles having one blue and one red filter for corresponding eyes. The result is that one image is seen with one eye and the other image is seen with the other eye in a superimposed relationship.

Stereoplotting equipment of the double-projection type described is well known in the art. Such apparatus as the Kelsh, ER–55, and Multiplex stereoscopic plotters have been described by Thompson in U.S. Geological Survey Circular 218 "Development of Photogrammetry in the U.S. Geological Survey," 1958. These devices employ red and blue light for projecting the two images and provide manual means for adjusting the light intensity of the individual projectors. However, there is always an imbalance between the red and blue light in some parts of every model, even where the condition has been partially remedied by such adjustment devices.

It has been discovered that the imbalance of light intensity may be altered by the use of novel spectacles having variable density filters.

Accordingly, it is an object of this invention to correct the light imbalance occurring in stereoscopic viewing. It is a further object of this invention to present novel spectacles and a process for their use in stereoplotting.

These and other objects and improvements of the instant invention will be seen more clearly in the description following and in the appended drawing wherein:

FIG. 1 is a perspective view of the novel apparatus in a first embodiment.

FIG. 1a is a cross-sectional view along line 1–a of FIG. 1.

FIG. 1b is a cross-sectional view along line 1–b of FIG. 1.

FIG. 2 is a perspective view of another embodiment of the invention.

FIG. 2a is a cross-sectional view along line 2–a of FIG. 2, and

FIG. 2b is a cross-sectional view along line 2–b of FIG. 2.

The cross-sectional views show the variable density coating in exaggerated thickness.

Referring to the drawing there is shown in FIG. 1 stereoviewing spectacles employing the variable-density principle for light balancing. The spectacles comprise a conventional frame 10 having a red light filter 20 and a blue left filter 30. The red filter 20 has a portion 21 below the horizontal normal viewing line which is homogeneously tinted or colored as in the conventional glasses worn by stereoplotters. Above the horizontal normal viewing line is a portion of increasing density 22, in which the light intensity reaching the viewer's eye is increasingly diminished as the viewer's head is lowered. In contradistinction to the red filter, the blue left filter has a portion 31 above the horizontal normal viewing line which is homogeneously tinted; and below the horizontal normal viewing line is a portion of increasing density 32, in which the light intensity reaching the viewer's eye is increasingly diminished as the viewer's head is raised. Thus the imbalance of light existing between the red and blue light at a particular point on the viewing plane may be easily remedied by a slight movement of the operator's head in a vertical direction.

The embodiment of FIG. 2 is analogous to that of FIG. 1; however, in this instance the movement of the viewer's head in a horizontal direction, either to the left or right, results in the decrease of light intensity reaching one or the other eye. In the horizontal embodiment of the principle, the right red filter 40 has an inside portion 41 to the left of the vertical normal viewing line which is homogeneously tinted or shaded. Toward the outside of the filter, or to the right of the vertical normal viewing line, is a portion 2 in which the density is increased gradually toward the outer edge of the filter. The blue left filter 50 of the horizontal embodiment has an inner portion 51 to the right of the vertical normal viewing line which is also homogeneously tinted; and to the left of the vertical normal viewing line is an outer portion of increasing density 52. Consequently, by moving the head to the left or to the right, the wearer may decrease the light intensity reaching either eye.

The principle of the balancing is that the viewer, wearing the variable-density stereoviewing spectacles, will change the proportion of red and blue light reaching his eyes by changing the portion of the filters through which he looks. This is accomplished by tilting the head upward (in the vertical embodiment) to look through the lower part of the filters or downward to look through the upper part of the filters. Correspondingly, in the horizontal embodiment of the invention, the proportion of red and blue light reaching the eyes is changed by slightly turning the head to the right to look through the left part of the filters or by slightly turning the head to the left to look through the right part of the filters. Thus used, a continuous adjustment of varying lighting conditions is quickly and easily made by a slight motion of the head, requiring no manual adjustments. Where a balanced light condition exists in the anaglyphic model, straight ahead viewing will be used.

The term "normal viewing line" as used herein indicates that portion of the filter through which the line of light would pass were the viewer to peer straight ahead, fix his eyes upon a point and turn his head to the right and to the left or to nod his head down and up. Also, the term "density" as used indicates the relative darkness of certain portions of the filter and refers only to light transmission properties of the filter. As is the practice in the optical arts the terms glasses or lenses refer to any transparent material and may include plastics, mica, etc.

Although red and blue filters are used as examples of the double-projection principle, it is well-known in the stereoscopic technology that other two-color light combinations, such as red and green, may be used as the spectra. The relative positions of the filters may be reversed as to color to match corresponding changes in the projection system.

The filters are preferably constructed by coating ordinary filter glasses in a density gradient with a very thin coat of nontransparent material from a central portion of the lens corresponding to the normal viewing area outwardly with increasing density toward the edges of the glasses. This can be obtained by a multilayer coating applied by such coating processes as vacuum deposition of a reflecting metal, such as aluminum, using a volatile metal compound such as aluminum fluoride. The coating material can be deposited in a very thin layer or layers at desired locations by masking the uncoated areas. In the coated areas of the filters, light striking the glass is partially reflected and partially transmitted.

Obviously, the spectacles may be modified to provide for prescription-ground lenses for correction of eyesight. The advantages of the present invention are in the simplicity and economy realized in the balancing of light and in the reduction of eye strain. Increased depth perception is obtained and it enables the operator to achieve greater discrimination in anaglyhic models.

The invention has been illustrated by specific examples but there is no intent to limit the invention to the specific details so disclosed in the description and drawing, except insofar as set out in the following claims.

I claim:

1. Anaglyphic stereoviewing spectacles adapted to be worn so as to enable sightings on a stereoscopic model, each of two lenses thereof having substantially equal first and second viewing areas extending oppositely from a vertical normal viewing line to the inner and outer side peripheral edges of said lens, respectively, and substantially equal first and second viewing areas extending oppositely from a horizontal normal viewing line to the upper and lower outer peripheral edges of said lens, respectively, comprising in association with one of said lenses a first filter transparent to a first light spectrum of said anaglyphic stereoviewing and in association with the other of said lenses a second filter transparent to a different light spectrum of said anaglyphic stereoviewing, said first filter covering said one of said lenses on said first and second areas oppositely extending with respect to one of said normal viewing lines thereof with a substantially homogeneous filtering density and a filtering density increasing toward anouter peripheral edge, respectively, and said second filter covering said other of said lenses on said first and second areas oppositely extending with respect to said one of said normal viewing lines thereof with a filtering density increasing toward an outer peripheral edge and a substantially homogeneous filtering density, respectively.

2. The anaglyphic stereoviewing spectacles of claim 1 wherein the said one of said normal viewing lines of said lenses is horizontal.

3. The anaglyphic stereoviewing spectacles of claim 1 wherein the said one of said normal viewing lines of said lenses is vertical.

References Cited

UNITED STATES PATENTS

| | | | |
|---|---|---|---|
| 1,422,527 | 7/1922 | Berger | 350—132 |
| 1,882,909 | 10/1932 | Rhue | 351—45 |
| 2,409,356 | 10/1946 | Hutchings | 351—450 X |
| 2,675,740 | 4/1954 | Barkley | 351—450 X |
| 1,332,410 | 3/1920 | Potts | 350—314 X |
| 1,865,691 | 7/1932 | Hill | 350—314 X |

FOREIGN PATENTS

| | | |
|---|---|---|
| 206,315 | 2/1957 | Australia. |
| 268,942 | 4/1927 | Great Britain. |
| 396,723 | 2/1909 | France. |
| 572,471 | 2/1956 | Italy. |

DAVID SCHONBERG, *Primary Examiner.*

P. R. GILLIAM, *Assistant Examiner.*

U.S. Cl. X.R.

351—44